United States Patent
Ciborowski et al.

(10) Patent No.: US 8,393,235 B2
(45) Date of Patent: Mar. 12, 2013

(54) PARTICULATE DISPERSION DEVICE FOR VEHICLE HARDWARE TESTING

(75) Inventors: Robert E. Ciborowski, Canton, MI (US); Jeffery E. Long, Canton, MI (US); Preston S. Reynolds, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 95 days.

(21) Appl. No.: 13/106,953

(22) Filed: May 13, 2011

(65) Prior Publication Data

US 2012/0285272 A1    Nov. 15, 2012

(51) Int. Cl.
*G01N 19/00* (2006.01)
(52) U.S. Cl. ....................................... 73/865.9
(58) Field of Classification Search .......................... None
See application file for complete search history.

(56) References Cited

U.S. PATENT DOCUMENTS

| | | | |
|---|---|---|---|
| 268,303 A | 11/1882 | Smith | |
| 3,269,754 A * | 8/1966 | Bertling et al. | 285/109 |
| 3,521,913 A * | 7/1970 | Verhein et al. | 285/109 |
| 3,817,096 A | 6/1974 | Osofsky | |
| 4,202,201 A | 5/1980 | Johnson | |
| 5,381,701 A | 1/1995 | Frankenthal et al. | |
| 5,753,800 A * | 5/1998 | Gilliam | 73/40.7 |
| 5,786,531 A * | 7/1998 | Lewis et al. | 73/114.16 |
| 5,988,003 A * | 11/1999 | Zuk | 73/865.6 |
| 6,227,038 B1 * | 5/2001 | Blossfeld et al. | 73/49.7 |
| 6,736,171 B2 | 5/2004 | Harris | |
| 7,127,958 B2 | 10/2006 | Blewett et al. | |
| 7,347,768 B1 | 3/2008 | Drew | |
| 2005/0235763 A1 | 10/2005 | Blewett et al. | |
| 2007/0131039 A1 * | 6/2007 | Willemin | 73/865.6 |

FOREIGN PATENT DOCUMENTS

JP    408068325    *    3/1996

* cited by examiner

*Primary Examiner* — Robert R Raevis
(74) *Attorney, Agent, or Firm* — Frederick A. Krieger

(57) ABSTRACT

A testing device for a vehicle part having an interior space is disclosed. The testing device includes a conduit, a test material source, and a controller. The conduit includes a first end and a second end, the first end operable to be disposed within the interior space of the vehicle part and the second end operable to be disposed outside the vehicle part. The test material source is in fluid communication with the conduit to provide a test material to the conduit. The controller is configured to direct the test material from the test material source through the conduit to the interior space in a predetermined manner.

18 Claims, 4 Drawing Sheets

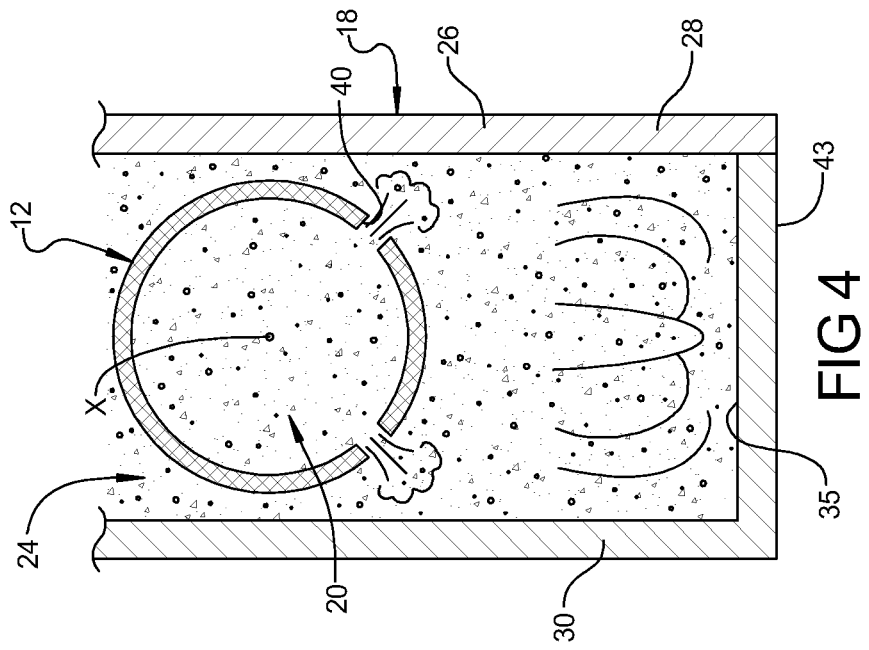
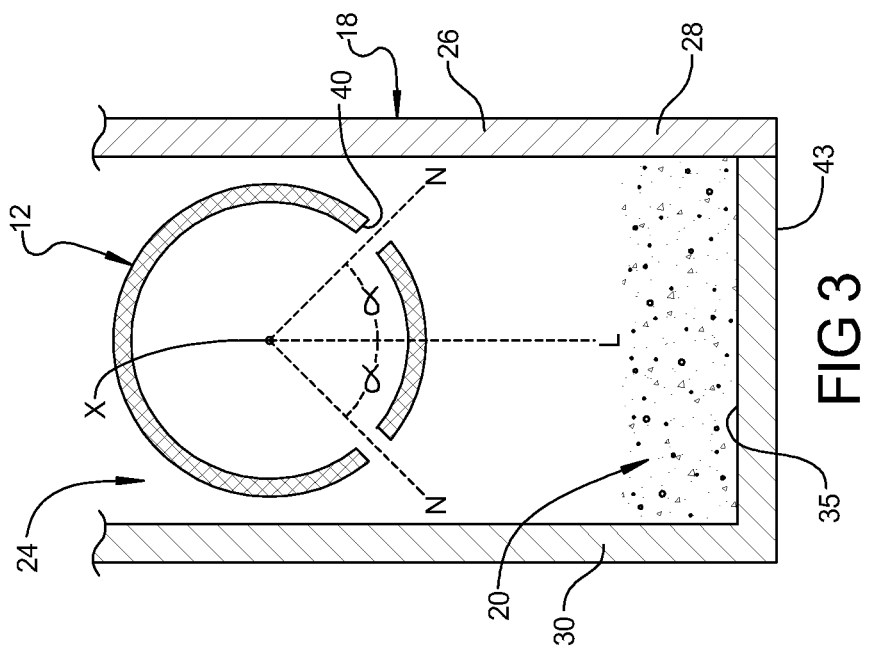

PARTICULATE DISPERSION DEVICE FOR VEHICLE HARDWARE TESTING

FIELD

The following relates to a particulate dispersion device and, more particularly, to a dust dispersion device for vehicle door hardware testing.

BACKGROUND

Vehicle parts are often subjected to various tests to determine whether the part satisfies certain criteria. For instance, a vehicle door assembly can be subjected to particulate testing, wherein particulate is intentionally applied to the door to determine the effect the particulate has on the door's operation. Particulate influence on door operation is desirable as the particulate can be introduced within an interior space within the door (e.g., between the inner and outer door panels) during manufacture, assembly and thereafter. Then, various parts of the door (e.g., latches, window glass and slider components, locks, etc.) can be actuated or otherwise tested to determine if any of the parts are rendered inoperable, squeak excessively, or otherwise malfunction or degraded due to the particulate. Accordingly, this testing can provide some indication of whether the vehicle door is likely to malfunction or otherwise degrade due to the particulate matter.

The following disclosure relates to a testing device that can be used for this type of testing. The testing device allows for convenient, highly accurate, and repeatable testing of vehicle parts, such as a vehicle door.

SUMMARY

A testing device for a vehicle part having an interior space is disclosed. The testing device includes a conduit, a test material source, and a controller. The conduit includes a first end and a second end, the first end operable to be disposed within the interior space of the vehicle part and the second end operable to be disposed outside the vehicle part. The test material source is in fluid communication with the conduit to provide a test material to the conduit. The controller is configured to direct the test material from the test material source through the conduit to the interior space in a predetermined manner.

Also, a method of testing a vehicle part is disclosed. The method includes coupling a conduit to a vehicle part such that a first end of the conduit is disposed within an interior space of the vehicle part and a second end of the conduit is disposed outside the vehicle part. The method further includes coupling a test material source in fluid communication with the conduit. The test material source is operable to provide a test material to the conduit. The method further includes controlling the test material from the test material source through the conduit to the interior space in a predetermined manner.

The method further includes a mechanism with a moving part, and further comprises moving the moving part after a predetermined amount of the test material has been provided to the interior space.

The method further includes that the test material exits the conduit to the interior space in particulate form.

The method further includes that the test material is at least one of a plurality of dust particles and a quantity of salt.

The method further includes controlling a propellant device to direct the test material through the conduit.

The method further includes controlling the test material to disturb previously collected test material within the interior space.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

BRIEF DESCRIPTION OF THE DRAWINGS

FIG. 3 is a section view of the testing device taken along line 3-3 of FIG. 2;

FIG. 4 is a section view of the testing device representing operation of the testing device.

DETAILED DESCRIPTION

Figure 1:
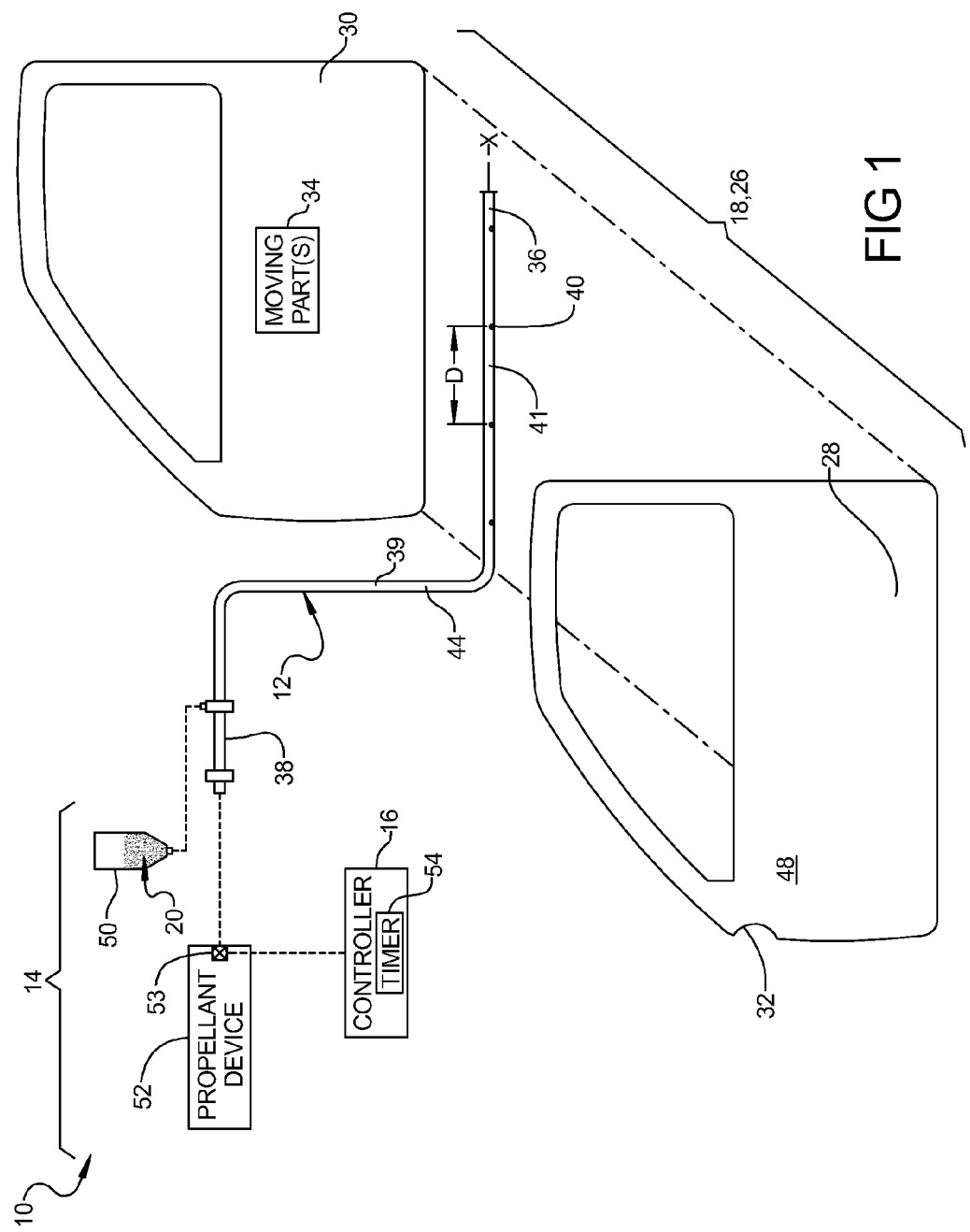
FIG. 1 is an exploded view of a testing device according to various exemplary embodiments of the present disclosure.
Figure 2:
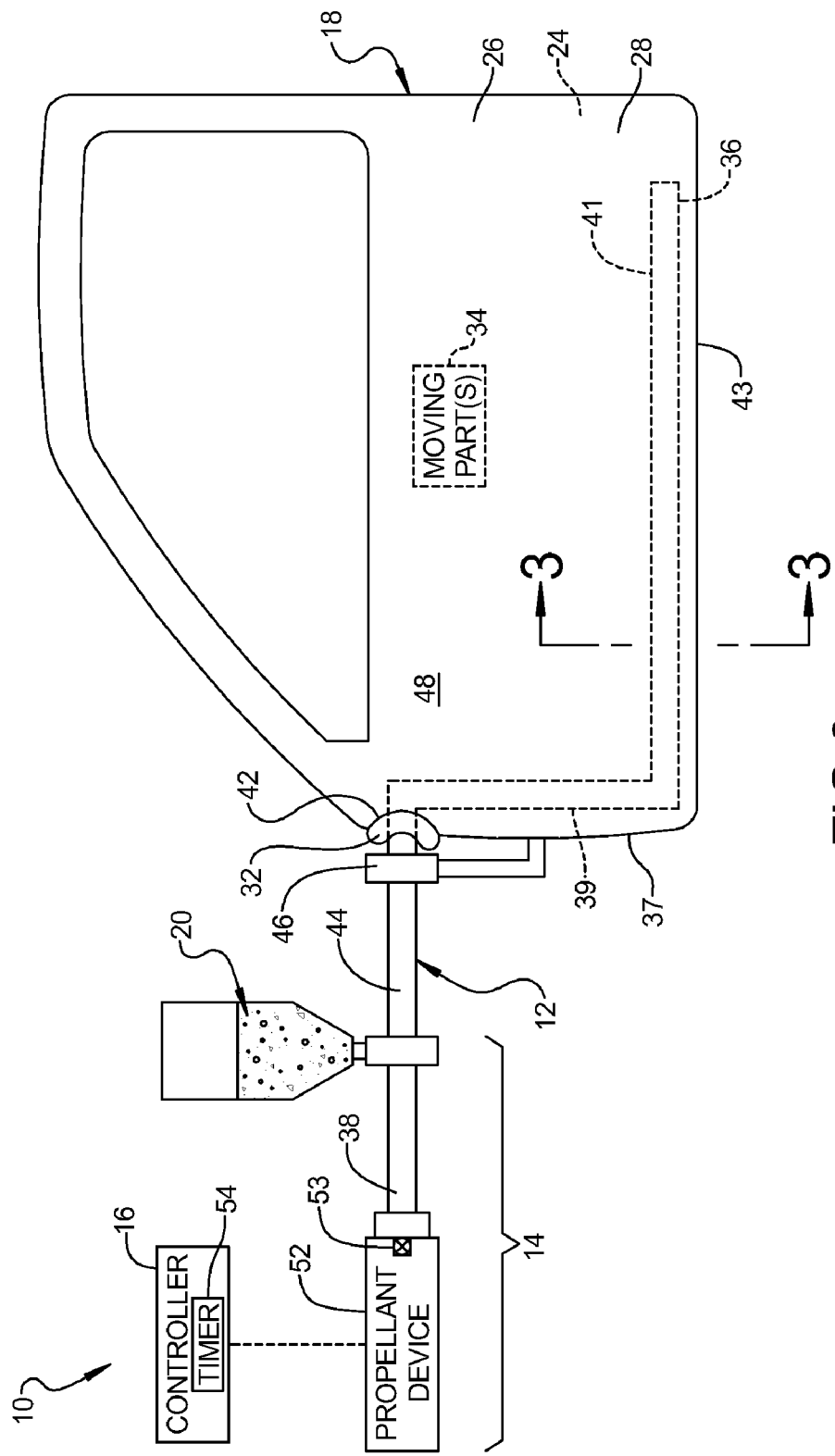
FIG. 2 is an assembled view of the testing device of FIG. 1.

Referring initially to FIGS. 1 and 2, a testing device 10 is illustrated according to various exemplary embodiments of the present disclosure. As shown, the testing device 10 can generally include a conduit 12, a test material source 14, a controller 16, and a vehicle part 18. As will be discussed, the test material source 14 can contain a test material 20. The test material can be particulate in solid, liquid, gaseous, etc. form, for example, paint particulate, dust particulate, a quantity of salt, and combinations thereof. The test material source 14 can provide the test material 20 to the conduit 12. The test material 20 can move through the conduit 12 and into an interior space 24 of the vehicle part 18 for testing purposes.

The controller 16 can be configured to direct the test material 20 in a predetermined manner through the conduit during the testing procedure. For example, the controller can be configured to direct the test material source 14 to limit a predetermined amount of particulate or provide particulate at a predetermined rate though the conduit to the interior space. In some embodiments the test material becomes particulate because of a configuration of the conduit at the location of where the test material exits the conduit in the interior space. Thus, as will be discussed, the testing performed with the testing device 10 can be better controlled, more accurate, more repeatable, and can better reflect real-world conditions in which the vehicle part 18 operates.

The vehicle part 18 can be any portion of the vehicle. For example, in some embodiments, the vehicle part 18 can be a vehicle door assembly 26 with an inner panel 28 and an outer panel 30. As shown in FIG. 2, the inner and outer panels 28, 30 can be joined such that the interior space 24 of the door assembly 26 is defined therebetween. The interior space 24 can be substantially sealed except for an access hole 32 defined in the door assembly 26, which provides access into the interior space 24. The inner panel 28 can define the access hole 32, the outer panel 30 can define the access hole 32, or both panels 28, 30 can cooperate to define an access pathway.

The door assembly 26 can also include at least one or more moving parts 34, schematically illustrated in FIGS. 1 and 2. The moving parts 34 can be of any suitable type, such as a door lock mechanism, a moveable window assembly, an electric motor, or any other part 34. The moving parts 34 can be operably supported within the interior space 24 of the door assembly 26. As will be discussed, the test material 20 can be provided into the interior space 24 using the testing device 10 to test how the moving parts 34 are affected by the presence of the test material 20 or particulate. However, it will be appreciated that other portions of the door assembly 26 can be tested using the testing device 10.

As shown in FIGS. 3 and 4, the door assembly 26 can also include a collection surface 35 on which the test material 20 is likely to collect. It will be appreciated that the collection surface 35 can be any of the surfaces of the door assembly 26, horizontal, vertical, angled, straight, curved and combinations thereof. As shown, the collection surface 35 can be an interior, bottom surface of the door assembly 26. As will be discussed, the testing device 10 can be configured such that test material 20 collected on the collection surface 35 from previous testing can be disturbed and re-distributed during subsequent testing.

The conduit 12 can be an elongate, hollow tube having a first end 36 and a second end 38. The conduit 12 can be substantially rigid, or in other embodiments, the conduit 12 can be flexible. The conduit 12 can also be at least partially curved so as to define a non-linear conduit axis X (FIGS. 1 and 3). As shown in FIG. 2, the conduit 12 can extend into the interior space 24 of the door assembly 26 through the access hole 32 such that the first end 36 of the conduit 12 is disposed within the interior space 24 and the second end 38 is disposed outside the door assembly 26.

The conduit 12 can be bent and curved and otherwise shaped according to the dimensions of the interior space 24 such that the conduit 12 avoids interfering with the door panels 28, 30, the parts 34 of the door assembly 26, etc. For instance, as shown in FIG. 2, the conduit 12 can include a substantially vertical portion 39 that extends along a forward edge 37 of the door assembly 26, and the conduit 12 can include a substantially horizontal portion 41 that extends along a lower edge 43 of the door assembly 26, directly adjacent the collection surface 35. It will be appreciated that the length of the horizontal portion 41 can be configured according to the length of the lower edge 43 of the door assembly 26 and/or according to the length of the collection surface 35.

Moreover, in some embodiments, a sealing member 42, such as an O-ring, tape, a bead of sealing material like silicon, etc., can be included for substantially sealing an outer surface 44 of the conduit 12 to the vehicle door assembly 26 adjacent the access hole 32. Additionally, as shown in FIG. 2, a retaining device 46, such as a clamp, a bracket, etc., can retain the conduit 12 to an outer surface 48 of the door assembly 26.

The conduit 12 can include at least one aperture or nozzle 40 through which the test material 20 exits the conduit 12. The aperture or nozzle is configured to allow particulate from the interior of the conduit to enter the interior space in atomized form. The aperture or nozzle can be sized, shaped (e.g. tapered apertures), or apertures fitted with a member to direct the particulate in an atomized form to the interior space. In some embodiments, the nozzles 40 produce a mist, particulate, containing the test material 20. In one exemplary embodiment as shown in FIGS. 1 and 3, the conduit 12 can include a plurality of nozzles 40, and each nozzle 40 can be a through-hole of any appropriate size (e.g., between approximately 1/16 and 1/32 inch diameter). In another embodiment, the end of the conduit in the interior space is plugged while the test material exits apertures or nozzles along a length of the conduit within the interior space.

The conduit 12 can include any number of nozzles 40, and the nozzles 40 can be disposed in any suitable location on the conduit 12. For instance, the nozzles 40 can each be disposed on the horizontal portion 41 of the conduit 12. Also, as shown in FIG. 1, the nozzles 40 can be spaced apart at a distance D from each other along the conduit axis X. Moreover, as shown in FIG. 3, the nozzles 40 can be angularly spaced apart at a distance ($\alpha \times 2$) about the conduit axis X. Specifically, in the embodiments illustrated, the conduit 12 includes eight nozzles 40 (four groups of nozzles 40 spaced apart along the conduit axis X and each group including two nozzles 40 angularly spaced away about the conduit axis X). However, the number and location of the nozzles 40 can be configured according to the dimensions of the interior space 24 and items of interest in the space such that test material 20 delivered through the nozzles 40 is distributed as desired into the interior space 24.

As shown in FIG. 3, each nozzle 40 can define a nozzle axis N, which is directed generally downward, toward the lower edge 43 and toward the collection surface 35. In an exemplary embodiment, an imaginary line "L" can be defined from the conduit axis X to the collection surface 35, and the respective nozzle axis N of the nozzles 40 can be disposed at an acute angle $\alpha$ relative to the imaginary line L. The angle $\alpha$ can be of any suitable value, such as between approximately 40° and 50° (e.g., 45°). In other embodiments, the nozzles 40 are pointed directly at the collection surface 35 (i.e., the angle $\alpha$ is approximately zero degrees). Thus, as will be discussed, when the test material 20 is freshly delivered from the nozzles 40, the test material 20 previously collected on the surface 35 can be disturbed and re-distributed through the interior space 24.

As shown in FIG. 1, the test material source 14 can include both a test material container 50 and a propellant device 52. The container 50 can be a bottle or other container for containing a bulk supply of the test material 20, and the container 50 can be operably coupled to the second end 38 of the conduit 12 to supply the test material 20 into the conduit 12. The propellant device 52 can be operable to propel an amount of the test material 20 through the conduit 12 and into the interior space 24 of the door assembly 26. The propellant device 52 can be operably coupled to the second end 38 of the conduit 12, downstream of the container 50.

It will be appreciated that the test material 20 can be of any suitable type. In some embodiments, test source material will have a size range of 5 to 200 microns. In certain embodiments, particulate exiting the conduit or a nozzle at the interior space will have a size range of 5 to 200 microns. In some embodiments, the test material 20 can be a 50/50 blend of fine and coarse testing dust. Generally, dust rated as fine or coarse consists of a percentage of various sizes based on volume. For instance, fine dust may have a makeup such as 12% at 0-5 µm; 12% at 5-10 µm; 14% at 10-20 µm; 23% at 20-40 µm; 30% at 20-40 µm and 9% at 80-200 µm. In other embodiments, the test material 20 can include salt. In still other embodiments, the test material 20 can include a combination of both dust and salt.

Also, it will be appreciated that the propellant device 52 can be of any suitable type. For instance, the propellant device 52 can include a pressurized tank, shop air, a pump, etc. for supplying high pressure air into the conduit 12 and propelling the test material 20 therethrough. In other embodiments, the propellant device 52 can provide water or other fluid into the conduit 12 for propelling the test material 20 therethrough. In the latter case, a slurry mixture of water, dust, and salt can be provided into the conduit 12 and into the interior space 24 of the door assembly 26. Also, in some embodiments, the test material 20 can be sucked into and propelled through the conduit 12 due to a Venturi effect occurring during operation of the propellant device 52.

As mentioned above, the device 10 can also include a controller 16. The controller 16 can be of any suitable type, such as a computerized device (e.g., personal computer) with an input device (e.g., keyboard, mouse, etc.), an output device (e.g., display screen, printer, etc.), as well as computerized memory modules, a processor, programmed logic, and the like. The controller 16 can be in communication (e.g., wired or wireless communication) with the test material source 14. For instance, the controller 16 can selectively control a valve 53 of the propellant device 52 and selectively turn the valve 53 ON and OFF. When the valve 53 is turned ON, air, water, or other fluid can propel the test material 20 through the conduit 12 and into the interior space 24, and when the valve 53 is turned OFF, the supply of fluid and test material 20 can be substantially cut off.

The controller 16 can also include a timing device 54. The timing device 54 can measure the amount of time that the valve 53 of the propellant device 52 is turned ON. The amount of test material 20 can be dependent on the amount of time that the valve 53 is turned ON. As such, the amount of test material 20 supplied to the conduit 12 and propelled into the interior space 24 can be limited to a predetermined amount.

In some embodiments, the propellant device 52 supplies air between approximately 70 and 100 psi. Also, the controller 16 turns the valve 53 ON for a short time interval (e.g., approximately 1 to 2 seconds). As such, approximately 50 cc of test material 20 (i.e., the predetermined amount of test material 20) is supplied into the interior space 24 per test. It will be appreciated, however, that these variables can be varied in any suitable manner. For instance, in one embodiment test material/particulate is directed through the conduit to the interior space in a predetermined amount, in another embodiment the test material is directed to the interior space at a predetermined rate, or combinations thereof. In another exemplary embodiment, multiple conduits are utilized to direct particulate to the interior space.

Accordingly, it will be appreciated that the testing device 10 can accurately control the amount of test material 20 provided into the interior space 24 of the door assembly 26. Thus, the test can be highly repeatable over a broad range of door assemblies 26.

Also, the door assembly 26 can remain largely intact during testing. In other words, the door assembly 26 need not be disassembled for testing. Thus, the testing can better reflect real-world conditions and can be more accurate as a result.

Figure 5:
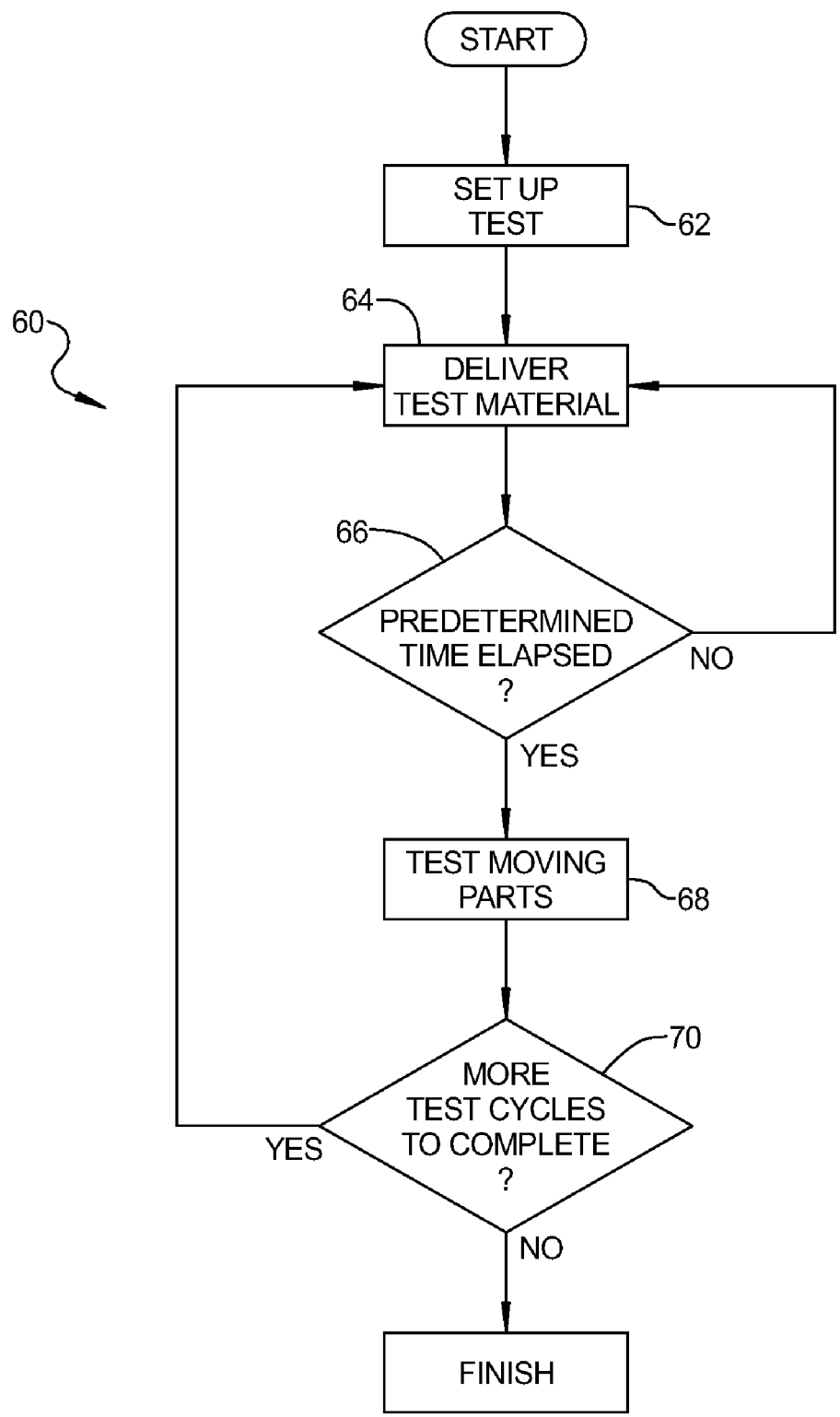
FIG. 5 is a flowchart representing a method of use of the testing device.

Referring now to FIG. 5, a method 60 of testing using the testing device 10 is illustrated according to various exemplary embodiments. The method 60 can begin in block 62, wherein the testing device 10 is set up. For instance, the conduit 12 can be inserted into the access hole 32, the container 50 and the propellant device 52 can be connected to the conduit 12, and the controller 16 can be connected to the propellant device 52. The sealing member 42 and the retaining device 46 can also be attached as discussed above.

Then, in block 64, the controller 16 can selectively turn the valve 53 to the ON position, causing the test material 20 to begin to move through the conduit 12. Next, in decision block 66, it is determined whether the predetermined time interval has elapsed as determined by the timing device 54. If time remains (decision block 66 answered negatively), then the valve 53 remains in the ON position and the test material 20 continues to move into the door assembly 26. However, once the predetermined time interval has elapsed (decision block 66 answered affirmatively), then the controller 16 turns the valve 53 OFF, leaving the predetermined amount of the test material 20 within the interior space 24 of the door assembly 26. Also, instead of turning the valve 53 ON only once in blocks 64 and 66, in some embodiments, the valve 53 can be alternatingly turned ON and OFF in quick succession (e.g., five times) to supply the predetermined amount of test material 20 in blocks 64 and 66.

Next, in block 68, the door assembly 26 can be inspected to determine the effect of the test material 20 on the door assembly 26. For instance, the moving parts 34 (door locks, handles, window assemblies, motors, or other mechanisms) can be moved, actuated, or otherwise inspected to determine if any of these moving parts 34 malfunctions (fails to move, excessively resists movement, squeaks excessively, etc.). In some embodiments, the testing of block 68 can include repeated and cyclical movement of the moving parts 34. Specifically, the moving parts 34 can be subjected to approximately 5000 movement cycles in some embodiments. For instance, a door lock can be locked and unlocked repeatedly for 5000 cycles. As a result of this testing, it can be determined whether or not the door assembly 26 can withstand exposure to dust or other corrosive materials during its useable life.

Also, in some embodiments, blocks 64-68 can be repeated for any number of test cycles. For instance, the testing regimen can include five test cycles (i.e., supplying the test material 20, then testing the moving parts 34, and repeating each of these steps four more times in succession). Thus, in block 70 of FIG. 5, it is determined whether there are remaining test cycles to complete. If there are remaining test cycles (block 70 answered affirmatively), then block 64 follows; however, if there are no remaining test cycles (block 70 answered negatively), then the method 60 is completed.

Also, during latter test cycles, the amount of test material 20 supplied in blocks 64 and 66 can be reduced since test material 20 from previous test cycles may already be present in the vehicle door assembly 26 (e.g., on the collection surface 35), and freshly supplied test material 20 can disturb and re-distribute test material 20 on the collection surface 35.

Thus, in some embodiments, block 64 can initially include turning the valve 53 ON and OFF five times to supply an initial amount of test material 20. Then, in block 68, the moving parts 34 can be moved for 5000 cycles. Then, while repeating block 64, the valve 53 can be turned ON and OFF four times to supply an additional amount of test material 20, and in block 68, the moving parts 34 can be moved for 5000 more cycles. Again repeating block 64, the valve 53 can be turned ON and OFF three times, and in block 68, the moving parts 34 can be moved for 5000 cycles. Subsequently repeating block 64, the valve 53 can be turned ON and OFF two times, and in block 68, the moving parts 34 can be moved for 5000 more cycles. In a final repeat of block 64, the valve 53 can be turned ON and OFF just once, and in block 68, the moving parts 34 can be moved for 5000 additional cycles. In another embodiment, parts of the door assembly, vehicle part, can be moved while test material is being directed into the interior space through the conduit.

In summary, the door assembly 26 can be tested and validated for use using the test device 10 of the present disclosure. The test device 10 can allow for accurate and highly repeatable testing that closely reflects real world conditions.

What is claimed is:

1. A testing device for a vehicle part having an interior space, the device comprising:
   a conduit having a first end and a second end, the first end operable to be disposed within the interior space of the vehicle part and the second end operable to be disposed outside the vehicle part;

a test material source in fluid communication with the conduit to provide a test material to the conduit; and a controller configured to direct the test material from the test material source through the conduit to the interior space in a predetermined manner, wherein the conduit includes a plurality of nozzles that are spaced apart at a distance from each other in the interior space of the vehicle part.

2. The testing device of claim 1, wherein the vehicle part is a vehicle door assembly defining the interior space therein, the vehicle door assembly includes an access hole providing access into the interior space, the conduit extending into the interior space via the access hole.

3. The testing device of claim 2, further comprising a sealing member that substantially seals an outer surface of the conduit to the vehicle door assembly adjacent the access hole.

4. The testing device of claim 2, further comprising a retaining device that retains the conduit to an outer surface of the vehicle door assembly.

5. The testing device of claim 1, wherein the test material is at least one of a plurality of dust particles and a quantity of salt.

6. The testing device of claim 1, further comprising a propellant device operable with the test material source to propel the test material through the conduit, the controller being operable to control the propellant device such that the test material provided to the conduit is limited to a predetermined amount.

7. The testing device of claim 1, wherein the conduit includes a rigid tube with a non-linear conduit axis and the first end of the conduit includes a nozzle.

8. The testing device of claim 7, wherein the nozzle is directed generally toward a collection surface in the interior space of the vehicle part such that a fresh delivery of test material disturbs test material previously collected on the collection surface.

9. The testing device of claim 8, wherein the test material exits the conduit to the interior space in particulate form.

10. The testing device of claim 1, wherein the conduit has a conduit axis, and wherein the plurality of nozzles are spaced apart at a distance from each other along the conduit axis.

11. The testing device of claim 1, wherein the conduit has a conduit axis, and wherein the nozzles are angularly spaced apart at a distance about the conduit axis.

12. A method of testing a vehicle part comprising:

coupling a conduit to a vehicle part such that a first end of the conduit is disposed within an interior space of the vehicle part and a second end of the conduit is disposed outside the vehicle part;

coupling a test material source to the conduit, the test material source in fluid communication with the test material source to provide a test material to the conduit; and controlling the test material source to direct the test material in a predetermined manner through the conduit to the interior space, wherein the vehicle part is a vehicle door assembly.

13. The method of claim 12, wherein the vehicle part includes a mechanism with a moving part, and further comprising moving the moving part after a predetermined amount of the test material has been provided to the interior space.

14. The method of claim 13, further comprising repeating both the controlling of the test material source to deliver the predetermined amount of the test material and the moving of the moving part.

15. The method of claim 12, wherein the test material exits the conduit to the interior space in particulate form.

16. The method of claim 12, wherein the test material is at least one of a plurality of dust particles and a quantity of salt, and wherein the controlling of the test material source includes controlling a propellant device to direct the test material through the conduit.

17. The method of claim 12, wherein the controlling the test material includes disturbing previously collected test material within the interior space.

18. The method of claim 12, further comprising substantially sealing the conduit to the vehicle part.

* * * * *